US012739592B2

(12) United States Patent
Haas et al.

(10) Patent No.: US 12,739,592 B2

(45) Date of Patent: Sep. 15, 2026

(54) VISUAL PLATFORMS FOR CONFIGURING AUDIO PROCESSING OPERATIONS

(71) Applicant: Cerence Operating Company, Burlington, MA (US)

(72) Inventors: Gabriel Haas, Ulm (DE); Markus Funk, Ulm (DE); Simon Graf, Ulm (DE); Tobias Wolff, Ulm (DE)

(73) Assignee: Cerence Operating Company, Burlington, MA (US)

( * ) Notice: Subject to any disclaimer, the term of this patent is extended or adjusted under 35 U.S.C. 154(b) by 86 days.

(21) Appl. No.: 18/390,032

(22) Filed: Dec. 20, 2023

(65) Prior Publication Data

US 2024/0205637 A1 Jun. 20, 2024

Related U.S. Application Data

(60) Provisional application No. 63/433,883, filed on Dec. 20, 2022.

(51) Int. Cl.

*H04S 7/00* (2006.01)

*G06F 3/01* (2006.01)

(52) U.S. Cl.

CPC ................ *H04S 7/40* (2013.01); *G06F 3/017* (2013.01); *H04S 7/302* (2013.01); *H04S 2400/13* (2013.01)

(58) Field of Classification Search

CPC . H04S 7/40; H04S 7/302; H04S 7/303; H04S 7/304; H04S 2400/13; H04R 29/008; H04R 1/40; H04R 3/005; H04R 2499/13; G06F 3/017

See application file for complete search history.

(56) References Cited

U.S. PATENT DOCUMENTS

| | | | | |
|---|---|---|---|---|
| 10,979,845 | B1 * | 4/2021 | Lovitt | H04S 7/304 |
| 11,470,439 | B1 | 10/2022 | Khaleghimeybodi et al. | |
| 2014/0136981 | A1 * | 5/2014 | Xiang | H04S 7/40 715/728 |
| 2018/0077513 | A1 * | 3/2018 | Link | G02B 27/017 |
| 2019/0369951 | A1 * | 12/2019 | Reiger | G06F 3/165 |

(Continued)

FOREIGN PATENT DOCUMENTS

WO 2019231630 A1 12/2019

OTHER PUBLICATIONS

Inoue Asuto et al., "Visualization System For Sound Field Using See-Through Head-Mounted Display," Acoustical Science and Technology, pp. 1-11 Jan. 1, 2019.

(Continued)

*Primary Examiner* — Yogeshkumar Patel

(74) *Attorney, Agent, or Firm* — Burr & Forman

(57) ABSTRACT

Disclosed are systems, methods, and other implementations, including a method for controlling a configurable audio processor, coupled via a plurality of transducers (such as the microphones 220A-C and/or the loudspeakers 224A-B of FIG. 2) to an acoustic environment, that includes determining a three-dimensional spatial variation in the acoustic environment of a processing characteristic of the audio processor based on configuration values for the audio processor, forming a three-dimensional image of the three-dimensional spatial variation of the processing characteristic, and providing the three-dimensional image for presentation to a user for controlling the configuration values.

31 Claims, 7 Drawing Sheets

(56) References Cited

U.S. PATENT DOCUMENTS

| | | | | |
|---|---|---|---|---|
| 2021/0329405 | A1* | 10/2021 | Eubank | G06F 3/011 |
| 2022/0272454 | A1* | 8/2022 | Seefeldt | G10L 25/78 |
| 2022/0342213 | A1* | 10/2022 | Lu | G06F 3/011 |

OTHER PUBLICATIONS

Communication Pursuant to Article 94(3) from corresponding European Application No. 23 212 818.1, mailed Dec. 1, 2025.

* cited by examiner

310
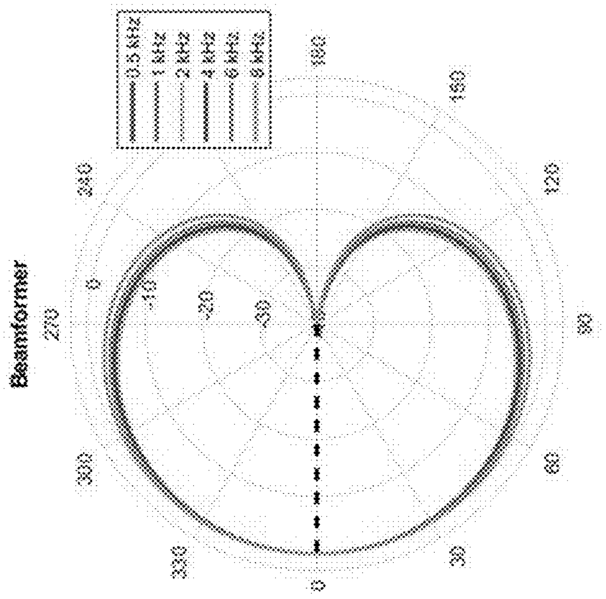
FIG. 3
300
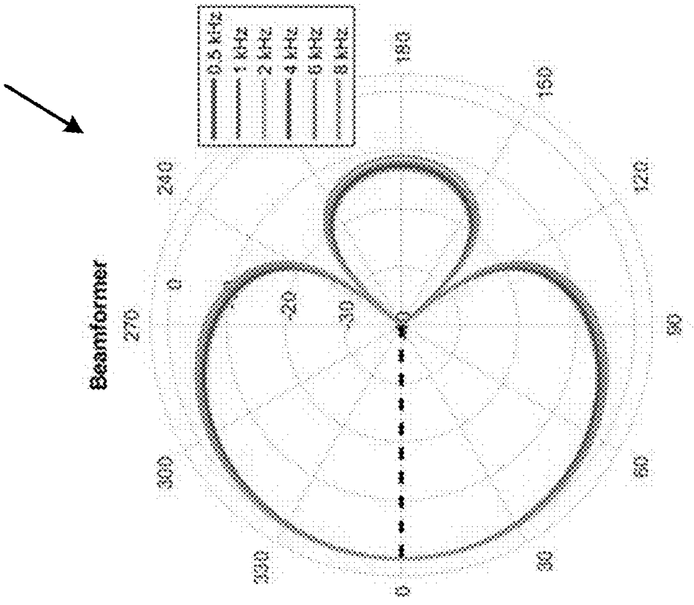

VISUAL PLATFORMS FOR CONFIGURING AUDIO PROCESSING OPERATIONS

CROSS REFERENCE TO RELATED APPLICATIONS

This application claims the benefit of U.S. Provisional Application No. 63/433,883, filed Dec. 20, 2022, the contents of which are incorporated herein.

BACKGROUND

The present disclosure relates to interactive control of an audio processing system through use of a user-interface in which 3D interactable visual objects representing audio processing characteristics can be rendered and manipulated by a user.

Audio processing systems (also referred to as speech signal enhancement (SSE) systems) seek to control and improve the quality of audio output in various sound environments. For example, cars equipped with audio processing seek to mitigate noisy sound components, and to enhance the sound signal quality of signal components produced by an actual speaker who is either attempting to interact with a voice assistant system or with a remote speaker.

A problem of configuring the increasingly sophisticated audio processing systems deployed in sound environments is that various processing characteristics (e.g., noise cancellation, sound sensitivity control), and the operational parameters controlling them, are imperceptible and can only be inferred through paying close attention to data of the sound behavior in the sound environment. This makes it challenging to configure and fine tune processing characteristics of audio systems deployed in the sound environments, resulting in a crude and non-intuitive configuration procedures.

SUMMARY

In one aspect, in general, an audio processing system includes an audio processor that is configurable to modify spatial variation (e.g., change spatial properties) of processing characteristics in an acoustic environment, for instance in the acoustic environment of a vehicle cabin. This spatial variation is shown to a user by rendering a three-dimensional image determined from the spatial variation of the characteristics, for example, being rendered via a virtual reality or an augmented reality platform. In some examples, the audio processor is, or is designed to be, coupled to the acoustic environment via multiple transducers, for instance via a microphone array and the processing characteristics include spatial variation of input sensitivity of the microphone array. In such a case, the three-dimensional image may show direction and/or extent of sensitivity, e.g., through a graphic rendering of a beam or funnel, that define the boundaries of a spatial zone with a sound environment in which a user could interact with the audio processing system. The three-dimensional image may further show a spatial variation of a level of an audio input captured by the microphone array. In some examples, a user viewing the rendering can provide input (e.g., hand gestures tracked and captured by a sensor device such as camera or a touchscreen) to modify the configuration of the audio processor. The spatial characteristics of gesture manipulation combined with the spatial characteristics of a 3D image representative of the audio processing characteristics (e.g., acoustic sensitivity) allows for an efficient and intuitive platform for controlling such audio processing characteristics. An advantage of providing the visual rendering of the spatial variation is that otherwise such spatial variation would not be readily perceived by the user based on audio processing of the system. Thus, a visual rendering (e.g., of an interactable 3D object) on a visualization platform provides an effective way of making specific adjustments to the configuration of the audio processor deployed in the sound environment (be it a car cabin, an office, a conference room, etc.)

The proposed solutions and approaches described herein employ an augmented reality visualization platform, or on some other visualization platform, including virtual reality platforms and 3D visualization rendered on 2-dimensional display surface devices (such as tablet devices, car display devices, etc.) to facilitate tuning and configuring audio processing systems (SSE systems) parameters. The tuning and configuration of such parameters may be performed during an initial configuration time (at a repair shop or factory, prior to on-road use of the car) or during regular use of the car, while the car is stationary or in motion. During an initial configuration time, an SSE engineer can listen to the processed signal after a setting has been changed. Using augmented reality information (or information for rendering audio processing characteristics on other visualization platforms), signals and parameters can be visualized, in addition to listening to the processed audio, to facilitate development, testing and optimization of the system. In some situations, the proposed solutions and approaches help visualize aspects of an acoustic scenery (e.g., where the sound sources are located in a room, whether those sound sources are moving, whether those sound sources are regularly active or sporadic, etc.) The proposed solutions and approaches can thus extract information about the sound environment that are then visualized in a three-dimensional image.

Several use scenarios of the proposed solutions and approaches include the following:

a) Beamforming—visually interacting with an otherwise “invisible beam” to changing the steering angle of the beam, and visualize the resultant generated beam pattern.
b) Visualization of audio zones—visualization of the target zone whose speech energy is to be captured by the speech processing spatial. For example, highlighting the driver zone while the drivers voice is being isolated from the rest (e.g., through passenger interference cancellation implementations).
c) Visualization of spatial voice activity—visualizing the activity or energy of sound sources (e.g., speakers in a car) at their respective spatial positions. Thus, the visualization platform of the systems described herein allows the visualization of who is speaking, and when.
d) Acoustic scene analysis—visualization of information provided by an audio processing system such as the number of sound sources, their position, their current activity, and other features.

The proposed framework achieves an isomorphic match between the operational parameters configured for the audio processor and a visual representation of those values. The visual representation provides the human perceivable version in the human-in-the-loop control/adjustment process of the configuration values of the operational parameters of the audio processor.

Thus, in some variations, a method for controlling a configurable audio processor, coupled via a plurality of transducers (such as the microphones 220A-C and/or the loudspeakers 224A-B of FIG. 2) to an acoustic environment, is provided. The method includes determining a three-dimensional spatial variation in the acoustic environment of a processing characteristic of the audio processor based on configuration values for the audio processor, forming a three-dimensional image of the three-dimensional spatial variation of the processing characteristic, and providing the three-dimensional image for presentation to a user for controlling the configuration values.

Embodiments of the method may include at least some of the features described in the present disclosure, including one or more of the following features.

The method may further include rendering the three-dimensional image to the user.

The method may further include processing an input from the user, received in response to a rendering of the three-dimensional image, to determine updated configuration values for the audio processor.

The method may further include determining an updated three-dimensional image based on an updated three-dimensional spatial variation of the processing characteristic determined in response to the input from the user, and rendering the updated three-dimensional image to the user.

The method may further include operating the audio processor according to the configuration values.

The plurality of transducers may include a microphone array.

The three-dimensional spatial variation in the acoustic environment of the processing characteristic may include a spatial variation of an input sound sensitivity.

The three-dimensional image may represent a direction of sensitivity of input sound sensitivity.

The three-dimensional image may further represent a spatial extent of the input sound sensitivity.

The three-dimensional spatial variation in the acoustic environment of the processing characteristic may further include a spatial variation of a level of an audio input captured by the microphone array.

The plurality of transducers may include a plurality of loudspeakers, and the three-dimensional spatial variation in the acoustic environment of the processing characteristic may include a spatial variation of an output gain.

Forming the three-dimensional image may include forming the three-dimensional image on a visualization platform comprising a rendering device that includes one or more of, for example, an augmented reality device, a virtual reality device, and/or a two-dimensional touchscreen device.

Controlling the configuration values of the processing characteristic of the audio processor may include capturing interactive user inputs, responsive to the three-dimensional image of the processing characteristic, to controllably vary the processing characteristic of the audio processor to achieve a target behavior of the audio processor according to the varied processing characteristic, determining adjusted configuration values of the processing characteristic to achieve the target behavior of the audio processor according to the varied processing characteristic, and configuring parameters of an audio system controlled by the audio processor according to the determined adjusted configuration values of the processing characteristic.

Capturing the interactive user inputs may include capturing user hand gestures indicative of changes to the processing characteristic.

In some variations, an audio processing system is provided that includes a visualization platform, a plurality of transducers (such as the microphones 220A-C or loudspeakers 224A-B of FIG. 2), a configurable audio processor to at least control the plurality of transducers, and a controller in electrical communication with the visualization platform, the plurality of transducers, and the audio processor. The controller is configured to determine a three-dimensional spatial variation, in an acoustic environment, of a processing characteristic based on configuration values for the audio processor, form a three-dimensional image of the three-dimensional spatial variation of the processing characteristic, and provide the three-dimensional image for presentation on the visualization platform to a user to control the configuration values.

In some variations, a non-transitory computer readable media, for controlling a configurable audio processor coupled via a plurality of transducers to an acoustic environment, is provided. The computer readable media stores a set of instructions, executable on at least one programmable device, to determine a three-dimensional spatial variation in the acoustic environment of a processing characteristic of the audio processor based on configuration values for the audio processor, form a three-dimensional image of the three-dimensional spatial variation of the processing characteristic, and provide the three-dimensional image for presentation to a user for controlling the configuration values.

In certain variations, a computing apparatus is provided that includes one or more programmable devices to control a configurable audio processor, coupled via a plurality of transducers to an acoustic environment, according to any of the method steps described above.

In certain variations, a non-transitory computer readable media is provided that is programmed with a set of computer instructions executable on a processor that, when executed, cause operations comprising any of the various method steps described above.

Embodiments of the above system, the apparatus, and the non-transitory computer readable media may include at least some of the features described in the present disclosure, including at least some of the features described above in relation to the method.

Other features and advantages of the invention are apparent from the following description, and from the claims.

BRIEF DESCRIPTION OF THE DRAWINGS

These and other aspects will now be described in detail with reference to the following drawings.

FIG. 3 includes graphs illustrating beam patterns created by an array of two microphones.

Like reference symbols in the various drawings indicate like elements.

DETAILED DESCRIPTION

The proposed framework described herein implements an audio processor with a user interface in which processing characteristics of the audio processor can be defined and manipulated. In an example of the proposed framework, a three-dimensional image representative of a processing characteristic of the audio processor (e.g., a beam pattern), that represents a region of acoustic activation or sensitivity, is formed and rendered on an interactive visualization platform that allows the interacting user to manipulate the configuration values of the processing characteristic by, for example, simple hand gestures. For instance, the user can move the opening of the beam/funnel to another area of visualization platform, or manipulate the dimensions of the 3D image to change its orientation and/or size. A controller can, in response to the manipulation input from the user derive parameters values for sound devices controlled by the audio processor. For example, the controller can compute new operational parameters (e.g., microphone sensitivity, amplitude delay parameters, etc.) controlling operations of the transducer devices coupled to the audio processor. The change to the transducers' parameters changes the pattern (orientation and size) of a microphone beam, thus changing the sound sensitivity profile in the sound environment (e.g., causing acoustics from a particular speaker to more prominently be sensed by the microphone array).

Figure 1:
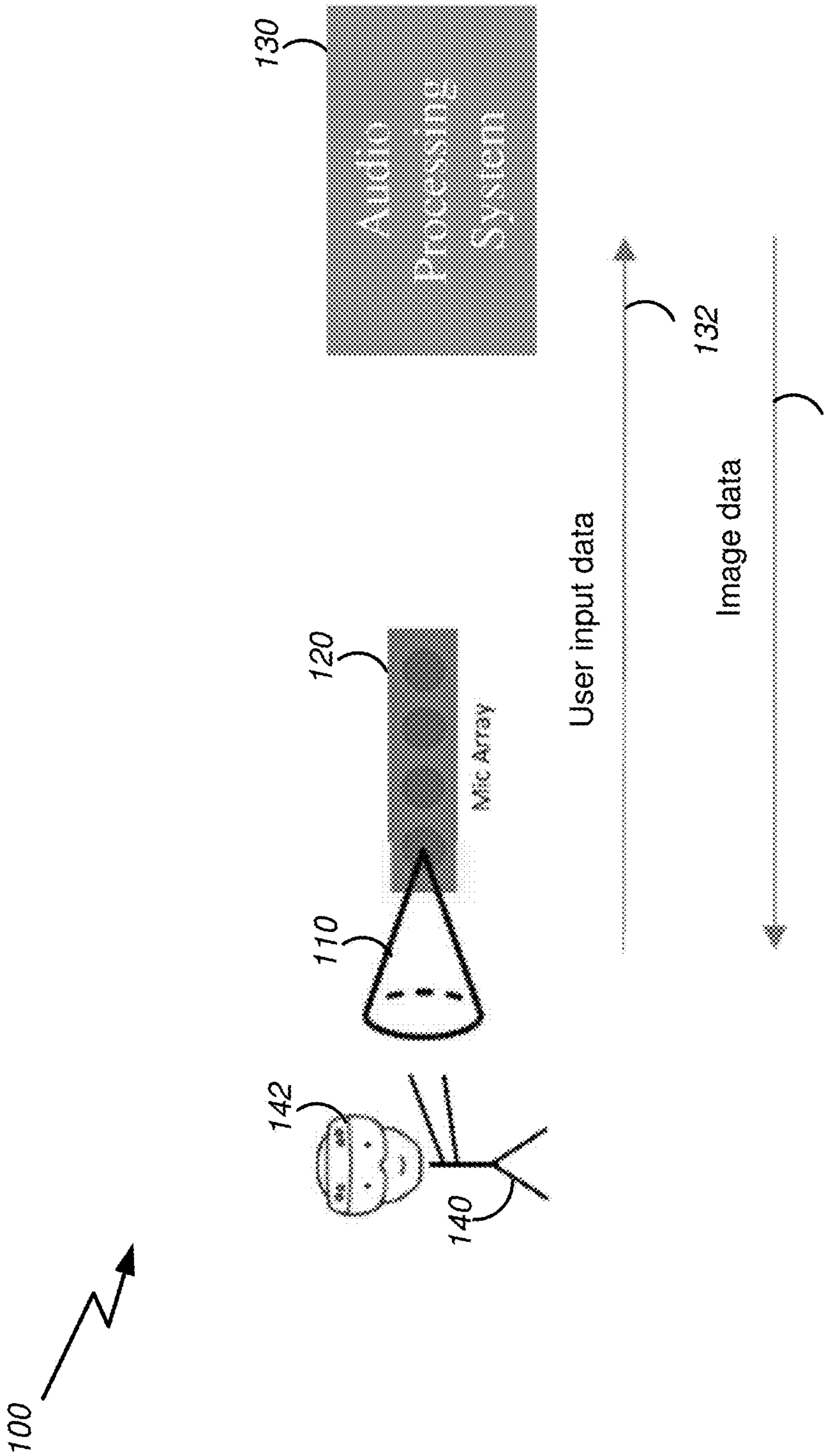
FIG. 1 is a schematic diagram of a system employing an augmented reality platform to configure an audio processing system.

Consider, as a simple example, an illustration 100 in FIG. 1, showing use of an augmented reality platform on which an image of an interactable beam 110 is rendered to control attributes of a sound sensitivity beam pattern produced by the audio processing system 130. The sound sensitivity pattern is formed by the interaction of microphones in an array 120 configured according to some initial microphone operational parameter values. As depicted in FIG. 1, a user 140, equipped with an augmented reality or virtual reality goggles 142 (the goggles are also referred to as a rendering device, and may include other types of devices, such as tablet or smartphone devices, to render interactable graphic objects), receives from an audio system 130 image data 134 that causes a three-dimensional image of the beam 110 to form on the visualization platform the user 140 is using. For example, if the visualization platform is an augmented reality platform, a 3D rendering of the beam 110 will be superimposed on a normal view of the scene displayed through the goggles 142. As will be discussed in greater detail below, the audio system 130 includes an image generator and an audio processor (illustrated in FIG. 2) that controls processing characteristics (e.g., sound sensitivity with a noise environment, cancellation or reductions of various noisy elements captured from the sound environment, etc.) within a sound environment in which the user 140 is located. The audio processor configures processing characteristics, such as the sound sensitivity of the microphones in the sound environment, by deriving operational parameters of the various devices and subsystems it controls (such as the microphone array 120) to be configured to have a desired target behavior, e.g., a modified sound sensitivity that is attuned to a different part of the acoustic environment.

The system 130 (which, as noted, includes an audio processor and a framework for performing audio processing characteristics visualization) establishes communication link with the rendering device the user is using to visualize audio processing characteristics (such as spatial sound sensitivity), and provides the user with the image data 134 that is processed at the goggles 142 to render a 3D interactable image representation of the particular processing characteristic of the audio processor that is being visualized (e.g., the beam 110, representative of the of the sound sensitivity). Responsive to the visual rendering of the processing characteristic, the user provides input (identified as user input data 132) indicative of interactive manipulation of the three-dimensional rendering displayed on the visualization platform used by the user 140. For example, the user may be equipped with sensor/controller devices (including cameras, inertia sensors such as accelerometers, etc.) that are attached to the user (e.g., at or near the user's hands), that the user is holding, or that can otherwise track/sense movement and gestures performed by the user to manipulate the 3D image rendering of the audio processing characteristics. In the example of FIG. 1, the user may gesture a grabbing or pinching motion to simulate the grabbing of the beam's base, and move its finger in a direction corresponding to where the user wishes to shift the base of the beam pattern. The input data provided by the user may also include viewing data representative of features in the viewed scene the user is seeing and/or the direction at which the user's eyes are directed, thus providing additional information on how the user wishes to control/manipulate the spatial attributes of the beam. As will be discussed below, the user may also provide input (in the form of hand or body gestures) to control the dimensions of the beam (orientation and width of the beam), thereby further refining the sound sensitivity characteristics within the sound environment the user 140 is operating in. As noted, in some examples, the visualization platform may include touch sensitive device, such as a tablet device or a smartphone device, where the 3D image rendering of an audio processing characteristic would appear on a 2D display device, and manipulation input from the user is provided through touch gestures applied to the touchscreen display of the device.

Examples of use cases of the system 100, or of any of the other implementations described herein (as more particularly discussed below) include the following situations. A first example relates to the configuration and verification of the beamforming setup. An audio engineer may use the proposed framework to configure a microphone setup inside a vehicle in a more intuitive, faster, and less error-prone way. The 3D visualization inside a physical car helps to position the microphone arrays and find an optimal alignment of the beamformer. Due to the visualization of signals such as the speech signal energy which are also visualized in near real-time, the correctness of the configuration can be verified instantly. The beamform (i.e., beam pattern) can be adjusted at a later point by an occupant of the vehicle (e.g., the driver or a passenger).

A second example involves the demonstration of certain invisible (or imperceptible) audio system technology features to stakeholders (retailers, customers, car dealers, manufactures, and so on). Because audio technology is inherently invisible (i.e., its operation and effect cannot be naturally seen), it is hard to show and explain it to potential customers, and others interested in the technology. The in-place, 3D visualization of the technology helps to understand and communicate the function and benefits of beamforming, or of other audio processing characteristics and features. Due to the near real-time visualization of speech energy and further related signals, a stakeholder can interactively explore the technology and immediately see its effect. This helps to explain and demonstrate the effectiveness of the audio processing (SSE) technologies.

Figure 2:
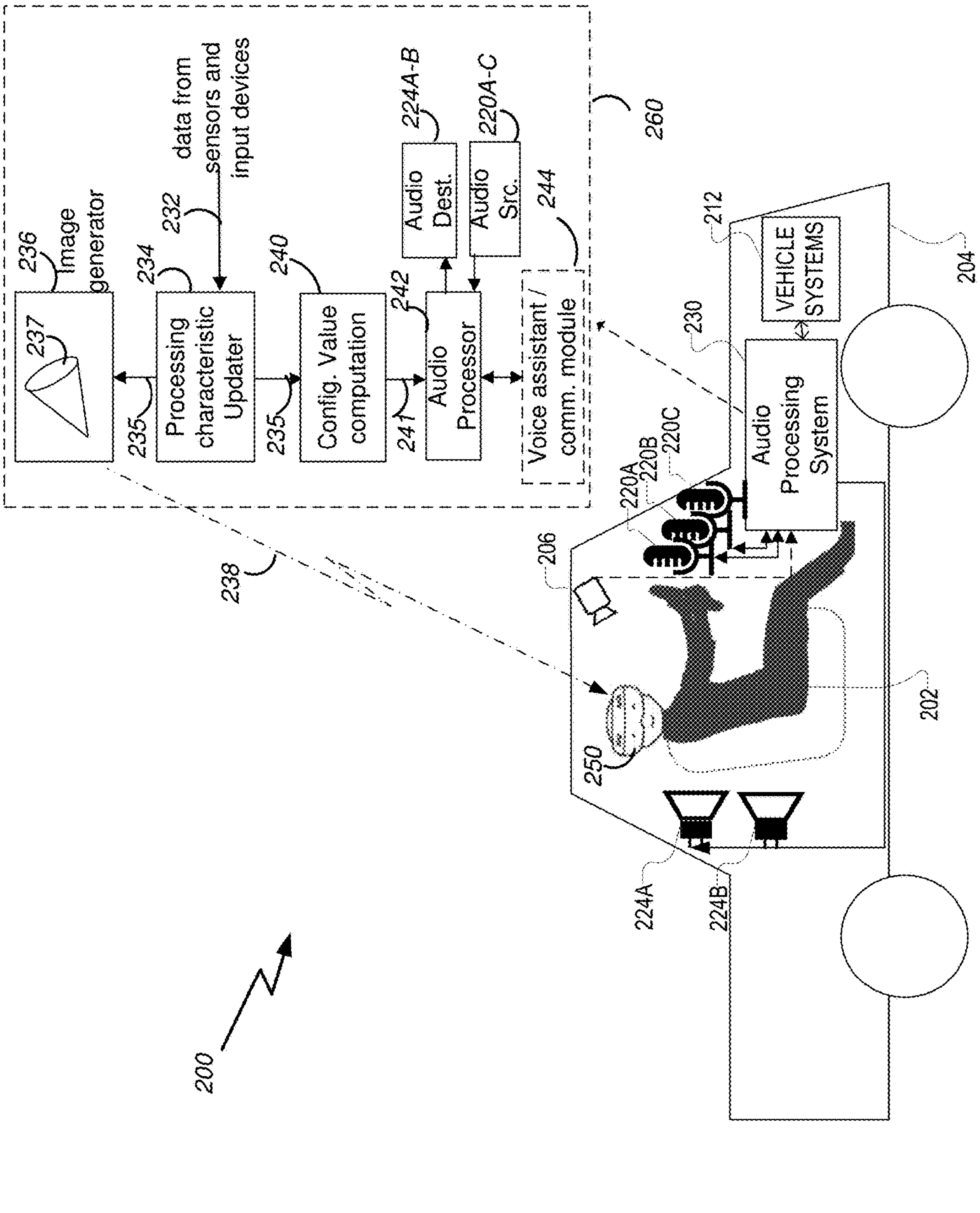
FIG. 2 is a schematic diagram of an example system to control audio processing characteristics using an interactive visualization platform.

FIG. 2 provides a more detailed schematic diagram of an example system 200, similar to the system 100 of FIG. 1, to control audio processing characteristics (such as sound sensitivity, sound cancellation) in a sound environment using an interactive visualization platform. Although the example of FIG. 2 depicts a car cabin sound environment in a car 204, the implementations of FIG. 2 can be used in other types of sound environments, such as open public spaces sound environment, office space sound environment, home sound environment, and any other environment in which various audio processing characteristics, such as spatial-based sound sensitivity, noise suppression, echo cancellation, etc., can be controlled using an interactive visualization platform. Details regarding noise reduction audio processing operations are provided in U.S. application Ser. No. 17/952,432, titled "Switchable Noise Reduction Profiles," the content of which is incorporated herein by reference in its entirety.

In FIG. 2, a user 202 is driving the car 204 that is equipped with an audio processing system 230 configured to control various audio processing characteristics in the sound environment within the car 204. The cabin of the car 204 is equipped with a plurality of transducer devices, such as a plurality of microphones 220A-C (arranged in an array in the present example), and one or more loudspeakers, such as loudspeakers 224A-B (arranged in a loudspeaker array in this example). As further illustrated in FIG. 2, the cabin of the car 204 is fitted with one or more sensors or input devices through which the user 202 can provide input to cause audio processing characteristics to vary/adjust as desired or needed. FIG. 2 depicts a camera 206 mounted in the car 202 that tracks/monitors the driver's movements and gestures, and captures video data that can be analyzed to determine the driver's interactive requests and commands. Although not specifically shown in FIG. 2, other sensors and input devices that can be fitted in the car 204, or directly on the user 202 include inertial/motion sensors (e.g., accelerometers, gyroscopes, etc.) that capture the driver's motion or movements, with the captured data then analyzed to determine if any operational change to the car's systems (including operational changes to the audio processing characteristics) has been indicated by the user. Another type of interactive input device that may be used by the drive is a touchscreen, such as those typically fitted on tablet devices or car display devices (e.g., on a car's navigation system display). A touchscreen display device can serve the dual role of being a rendering device on which audio processing characteristics (e.g., sound sensitivity represented as a beamform) is displayed, and can be manipulated to define a new processing characteristic configuration (e.g., steer or move the beamform to point in a different direction). As also shown in FIG. 2, renderings of graphical representations of the audio processing characteristics can be generated for display on an augmented reality of virtual reality visualization platform. For example, the user 202 is equipped with goggles 250 (which may be similar to the goggles 142 of FIG. 1) so that the driver 202 (or some other user) can see a three-dimensional image representation of the processing characteristic (e.g., the beamform) superimposed (in the case of an augmented reality platform) on a view seen by the driver/user. As further illustrated, in various examples, the audio processing system 230 may also receive input from vehicle systems 221, for example, providing vehicle state (e.g., speed of the vehicle, navigation state etc.), which may affect the operation of the audio processing system 230.

Among the processing characteristics that the audio processing system 230 can control, in some examples, is the spatial sound sensitivity that can be adaptively implemented through a microphone array comprising the microphones 220A-C (the microphone array can include any number of microphones larger than 2). FIG. 2 includes a block-diagram illustration of the audio processing system 230 shown inset 260. As shown the audio processing system includes an audio processor 242 that can adaptively control, inter alia, the microphone array 220A-C. As noted, the desired configuration of a beamform (or some other processing characteristic) is provided by the driver/user through input data that includes video data (captured by the camera 206) showing gestures and movement of the user to vary the configuration of the beamform, through motion data captured by inertial sensors, for example through voice data (commands uttered by the driver/user), through written data, etc. A target beamform is computed by a processing characteristic updater unit 234 that computes an adjusted configuration (orientation and dimensions) for the beamform (or for any other processing characteristic that can be controlled through, for example, the audio processor 242) in response to sensor and input data 232 captured by sensors and input devices such as the camera 206. The sensor and input data 232 represents the user's input (e.g., the user's gestures) indicative of desired changes to the audio processing characteristics for the audio processing system 230. For example, the sensor and input data 232 may indicate spatial variations to the sound sensitivity of a beamform representing an area of the sound environment that the microphones are attuned to. The sensor and input data 232 may include data representing, for example, visual gestures performed by the user to indicate the direction/orientation of the beamform, the beamform's dimensions, etc. Other examples of the sensor and input data 232 include speech data (in which the user verbalizes the desired changes), written data, and so on.

The processing characteristic updater unit 234 analyzes the input data provided through the various input devices and sensors to determine the nature of the changes requested by the user to the audio processing characteristics. For example, the video data may have captured the user grabbing or pinching the image rendering of the beamform's base and steering it a certain distance to another location. In an example, the processing characteristics updater unit 234 computes the relative distance the beamform base has moved (e.g., expressed in terms of pixels), and converts the relative distance computed (and other attributes of the beamform) to new configuration values representative of the new target configuration of the beamform (or other manipulatable processing characteristic). It is to be noted that the configuration values computed by the updater unit 234 may also be based on control input data that adjusts the current configuration values of sound sensitivity by increasing or decreasing current values of operational parameters (discussed in greater detail below) of the audio processor 242. For example, a user interfaces with virtual knobs and buttons may be manipulated to cause changes (typically incremental changes) to the operational behavior controlled by the audio processor. However, this type of adjustment control is generally cruder and less intuitive than the proposed visual solution and approaches discussed herein.

The new configuration values for the beamform, represented as configuration data 235, are next provided to an audio configuration value computation unit 240 which derives operational parameter values (marked as output 241 of the unit 240) that control operation of the transducers 220A-C (as well as the transducers 224A-B, and potentially other audio devices fitted in the sound environment) to configure the transducers to operate according to the input provided by the user. Thus, for example, in response to the input specifying the desired changes to the sound sensitivity pattern in the car 204, the audio configuration value computation unit 240 derives the filter parameter values for filtering implemented by the audio processor 242 that are applied to sound signals in a way that results in a spatial sensitivity pattern matching the new desired beam pattern specified by the driver/user 202. The audio configuration value computation unit 240 can similarly compute operational parameters for other audio devices (such as the transducers/loudspeakers 224A-B) that match, or are consistent with desired audio behavior (such as beam pattern of acoustic signals produced by the loudspeakers 224A-B) specified by the driver/user 202 based on the visualization of the audio behavior.

In the example of implementing a desired sound sensitivity beamform, the audio configuration value computation unit 240 derives, for example, filtering parameters applied to the sound signals captured by the various microphones of the array. To that end, the unit 240 is configured to compute respective delay or phase values, and signal weights for each of the microphones of the array that, in combination (as a result of wave interference of the sound signals when such delays, phases, and weighs are applied to captured sound signals) result in the desired sound sensitivity represented by the updated beamform determined by the processing characteristic updater 234. In some examples, the derivation of the filtering parameters for the various microphones of the array is performed according to one or more selected optimization processes such as, for example, the normalized least mean squares process.

Having computed updated operational parameter values for the microphone array (e.g., updated filtering parameters that implement filtering operations applied to signals captured by the microphone array) in accordance with the input from the driver or user, the audio processor applies the newly derived values to the sound signals received from the microphones 220A-C (represented by the box marked as "Audio Src.").

Similarly, there may be situations where the driver/user wishes configure operational behavior of other audio devices, such as the loudspeakers 224A-B, e.g., to define a beamform for propagation of acoustic sound in a desired way that improves the quality of sound reaching specific passengers or users. In such situations the user would specify, in response to a visual representation of audio operational characteristics of those other audio devices (e.g., current sound propagation pattern for the loudspeakers 224A-B) a modified pattern by, for example, gesturing or verbally specifying desired changes. The processing characteristics updater 234 would compute the resultant operational characteristics (e.g., a resultant propagation pattern in the visual frame used by the driver/user), and the unit 240 would compute device parameters to control the actual operational behavior of the loudspeakers. For example, the unit 240 may derive filter parameters (to cause the sound signals to have particular delays/phases, and/or gains) that are to be applied to sound signals that are to be forwarded to the loudspeakers. Once implemented by the audio processor 242, sound signals filtered according to the operational parameters computed by the audio configuration value computation unit 240 would propagate from the loudspeakers 224A-B in a manner consistent with the modified pattern specified by the driver/user.

As further illustrated in FIG. 2, the audio processor is generally coupled to a voice assistant/communication unit 244 (alternatively, the voice assistant/communication unit 244 may be part of the audio processor 242). The voice assistant/communication unit 244 is configured to perform voice recognition operations for speech uttered by one of the occupants of the car, and in response to commands or instructions identified in the recognized speech, the voice assistant/communication unit 244 is configured to generate control signaling to perform certain functionalities in accordance with the requests from the occupants. For example, the voice assistant may facilitate performance of navigation functionality, facilitate audio system functionality (including controlling sound sensitivity), and optionally control other car functionalities (light levels within the cabin, cruise control functionality, etc.) The communication circuitry of the unit 244 controls communication connection processing (e.g., with remote users in a "handsfree telephony" mode). The voice assistant/communication unit 244 may include (or may be coupled to) signal transmission/receiving circuitry to transmit and/or receive communication signals either directly to or from a remote user (e.g., based on WWAN communication technologies, such as LTE, implemented by the unit 244) or to establish a communication link with a nearby wireless device based on a communication protocol (such as Bluetooth™ or Bluetooth Low Energy™). Communication signals received from a remote caller can be routed from a locally receiving wireless device to the audio processor 240 via the voice assistant/communication unit 244, and from there directed to an audio destination (e.g., one or more of the loudspeakers 224A-B). Similarly, speech captured by the microphones 220A-C and processed by the audio processor 242 may be directed to a remote caller via the voice assistant/communication unit 244 either directly or indirectly via a nearby wireless device.

With continued reference to FIG. 2, the processing characteristic updater 234, which determines new configuration values corresponding to the desired input indicated by the user, also provides the configuration data to an image generator 236 that is configured to generate image data 237 representing a three-dimensional image corresponding to the processing characteristic that user is seeking to control (the image generator in effect provides a mapping from the configuration data computed by the updater 234 to the rendered image 237). It is to be noted that in some examples the image generator may be part of the processing characteristic updater 234. The output data (235) of processing characteristic updater 234 may be the actual image data representation that corresponds to the image 237, or may be data representing changes between the preceding three-dimensional image of the audio processing characteristic, and the now updated image, as modified by the user, that is to be presented to the driver/user 202. In the example of configuring a beamform representative of the spatial sound sensitivity within the sound environment, the image generator 236 generates data of the updated three-dimensional image representing the updated beam pattern with an orientation and dimensions that are commensurate with what the changes specified by the input from the driver/user 202. The image data 237 generated by the image generator matches (is isomorphic) with the audio operational parameters computed by the audio configuration value computation unit 240 and implemented by the audio processor 242.

The generated three-dimensional image data 237 is communicated, for example, using a communication link 238 that may be based on a short-range communication protocol such as Bluetooth™ or BLE™, or may be based on a wireless local area network (WLAN) communication protocol (e.g., WiFi), to a rendering device accessible by the user 202. In the example of FIG. 2, the rendering device is the goggle 250 which can superimpose a rendering of the image data 237 on a display through which the scene viewed by the user 202 is visible. Other types of rendering devices, such as a tablet device, a wireless communication device, a fixed display device within the sound environment, may also be used. It is to be noted that in various examples the image data (such as the image data 237) may be computed at the rendering device (e.g., the goggles 250). In such examples, the data transmitted to the goggles 250 may be the configuration data 235 determined by the processing characteristics updater 234. The rendering device 250 may implement an image generator (similar to the to the image generator 236 depicted in FIG. 2) to generate the image data and render it on a display device of the rendering device.

Having rendered the audio processing characteristics on the rendering device used by the driver/user, the user may subsequently make further changes, by interactively manipulating the rendered image (as may be captured by sensor devices such as the camera 206, inertial sensors, etc.) to further modify the processing characteristics. For example, if a beam pattern of the sound sensitivity indicates that the driver is the active speaker, and the driver wishes to have another occupant become the active speaker, the driver (or some other user) may gesture a grabbing of the base of the beamform to move it in the direction where the new speaker is located. In another example, and with reference to FIG. 3 showing beam patterns 300 and 310 created by an array of two microphone, the user may be configuring the audio processing system according to an adaptive beamforming process that optimizes spatial sound sensitivity according to the current sound field. This optimization results in a beam pattern that can be visualized on a visualization platform (such as the goggles 250) on which an image (2D or 3D) of the beam pattern (generated, for example, by the image generator 236) is rendered. The visualization of the resultant beam patterns 300 and 310 can be used to support analysis and further development (configuration and refinement). As noted, in various examples, the visualization of processing characteristics includes visualization of sound field characteristics, but without directly using such sound field characteristics to controllably modify operations/behavior of the audio processor. For example, a user might determine and visualize an acoustic angle of arrival while the audio processor's beamforming is fixed to a certain angle. Thus, the proposed solutions and approaches include implementations in which the current features of the acoustic environments are visualized, but without necessarily actively modifying any processing characteristic of an acoustic processor.

Figure 4A:
FIGS. 4A-C are illustrations of operational use of a visualization platform to configure sound sensitivity characteristics of an audio processing system.
Figure 4B:
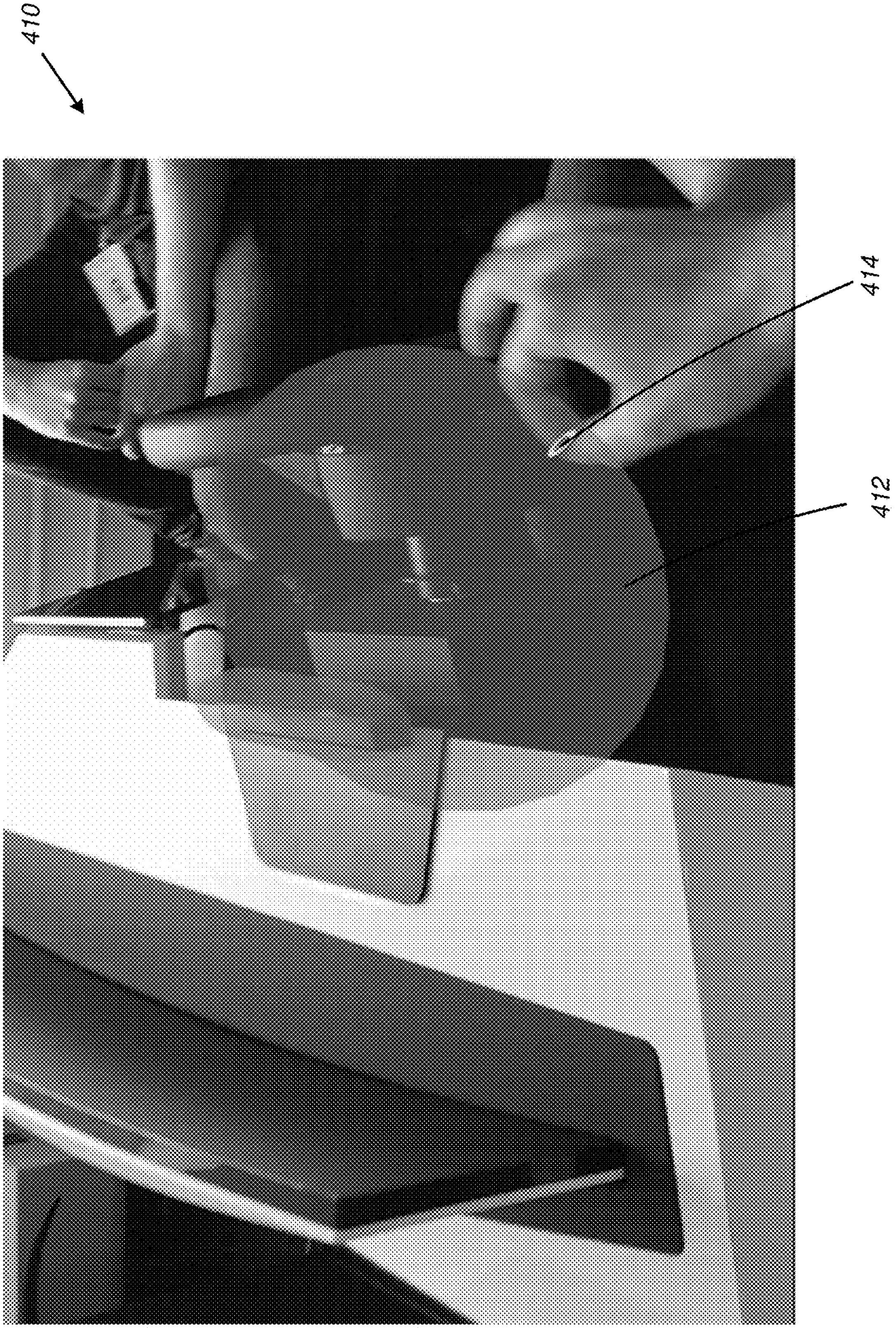
Figure 4C:
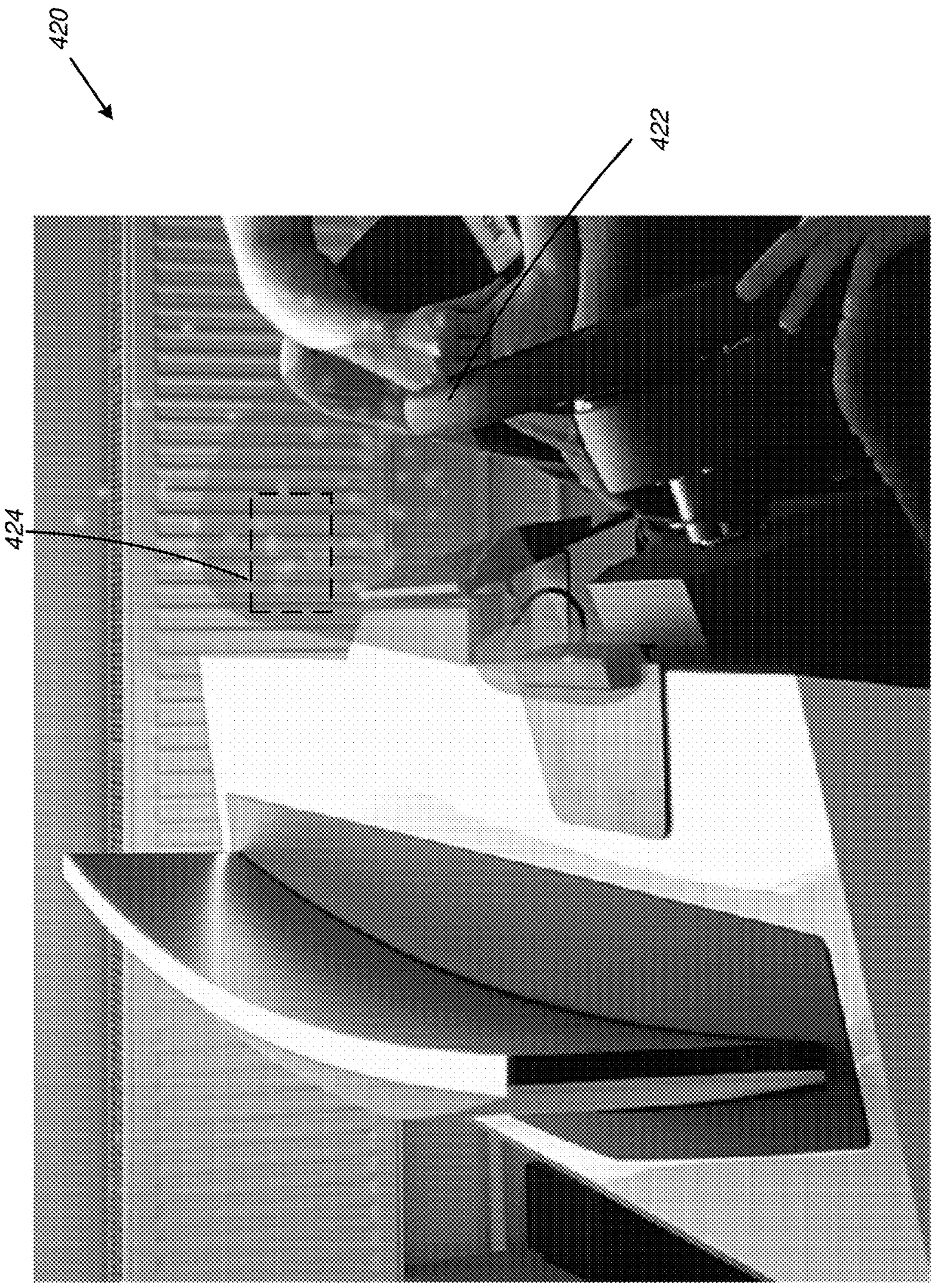

FIGS. 4A-C are illustrations/screenshots demonstrating operational use of a visualization platform to configure sound sensitivity characteristics of an audio system. The screenshots of FIGS. 4A-C illustrate a rendering of a three-dimensional interactive image of a beam pattern representing spatial sound sensitivity in a simulated sound environment of a car. Particularly, FIG. 4A includes a screenshot 400 of an augmented reality view as seen through goggles worn by a user standing outside the car model and simulating the role of a technician seeking to configure sound sensitivity characteristic of an audio processing system. The screenshot 400 shows an initial rendering of a cone-shaped image 402 (that would be generated in a manner similar to the image 237 of FIG. 2, and would be communicated to the user's rendering device via a communication link such as the link 238 of FIG. 2) of a beamform directed at the driver. The rendering indicates that the current configuration of a microphone array (similar to the array comprising the microphones 220A-C in FIG. 2) is such that the beam pattern is attuned to sound coming from the driver's direction, and is far less sensitive to sound coming from other areas of the sound environment.

FIG. 4B is a screenshot 410 taken at a subsequent instance to that of FIG. 4A in which the user outside the car is interactively gesturing to grab the base of the cone 412 (generated in a manner similar to the image 237 of FIG. 2, and communicated to the user's rendering device via a communication link such as the link 238 of FIG. 2) at a location 414 near the base of the cone 412, to move the cone in a direction towards the configuring user and away from the driver. The view is rendered in the augmented reality platform that the user can visualize, However, the actual sound sensitivity characteristics would be imperceptible to the users without the aid of a visualization platform. As described herein, the gesturing motion, which may be captured by a camera or motion sensors, is provided, in example embodiments, to a unit such as the processing characteristic updater 234 to compute the spatial changes indicated by the user's input to the visual rendering (i.e., the changes computed correspond to the changes to the three-dimensional image viewed by the user). The computed changes may be provided to an image generator, such as the image generator 236 of FIG. 2, which uses, for example, the current rendering data for the cone (beamform) and the computed changes corresponding to the user's interactive input to generate an updated image to be communicated to the visualization platform so that the user can view the rendering resulting from the user's input. Concomitantly, the changes resulting from the user's input are provided to a unit that computes the configuration values that would be required to update operational parameters of the circuitry of an audio processor that would result in the actual sound sensitivity (or some other audio processing characteristic) in the sound environment having a behavior/configuration matching that of the updated image rendered in the visualization platform.

As noted, the visualization platform may be configured to render visual representations of other audio processing characteristics. For example, FIG. 4C provides another screenshot 420 that visualizes the sound environment within the car model used in FIGS. 4A and B, illustrates the visualization of captured acoustic energy in the sound environment. As shown in FIG. 4C, the current configuration of the spatial sound sensitivity, represented by a beamform (cone) 422 pointing towards the passenger side of the car, is rendered on the visualization platform. When the passenger speaks, the acoustic energy captured within the cone 422 is displayed as speckles, such as the speckles within a marked rectangular area 424. As shown, the acoustic energy captured is arriving from the direction covered by the beamform 422, with acoustic energy from areas outside the beamform being significantly suppressed.

While not specifically illustrated herein, many other imperceptible audio processing characteristics controlled by an audio processor of the sound environment may be visualized in a manner similar to that discussed in FIGS. 4A-C. In some examples active speech zones within the car (e.g., in situations where separate microphones and loudspeakers are deployed in separately defined zones) may be represented in a visualization platform by rendering sound booths in the viewed scene. Such booths may be rendered as walled boxes or rooms that cover the different zones. Interactive control of activating those booths may be performed by pointing at an area where a walled section needs to be activated, or through verbal input. Other examples of audio processing characteristics may include visual representations of noise suppression cancellation operations, visual representations of audio areas and types of sound that emanates from loudspeakers (e.g., controlling how an audio presentation of a classical music piece should be heard by occupants of the sound environments, with string sound components produced at one loudspeaker, and brass sound components produced at another loudspeaker), etc.

Figure 5:
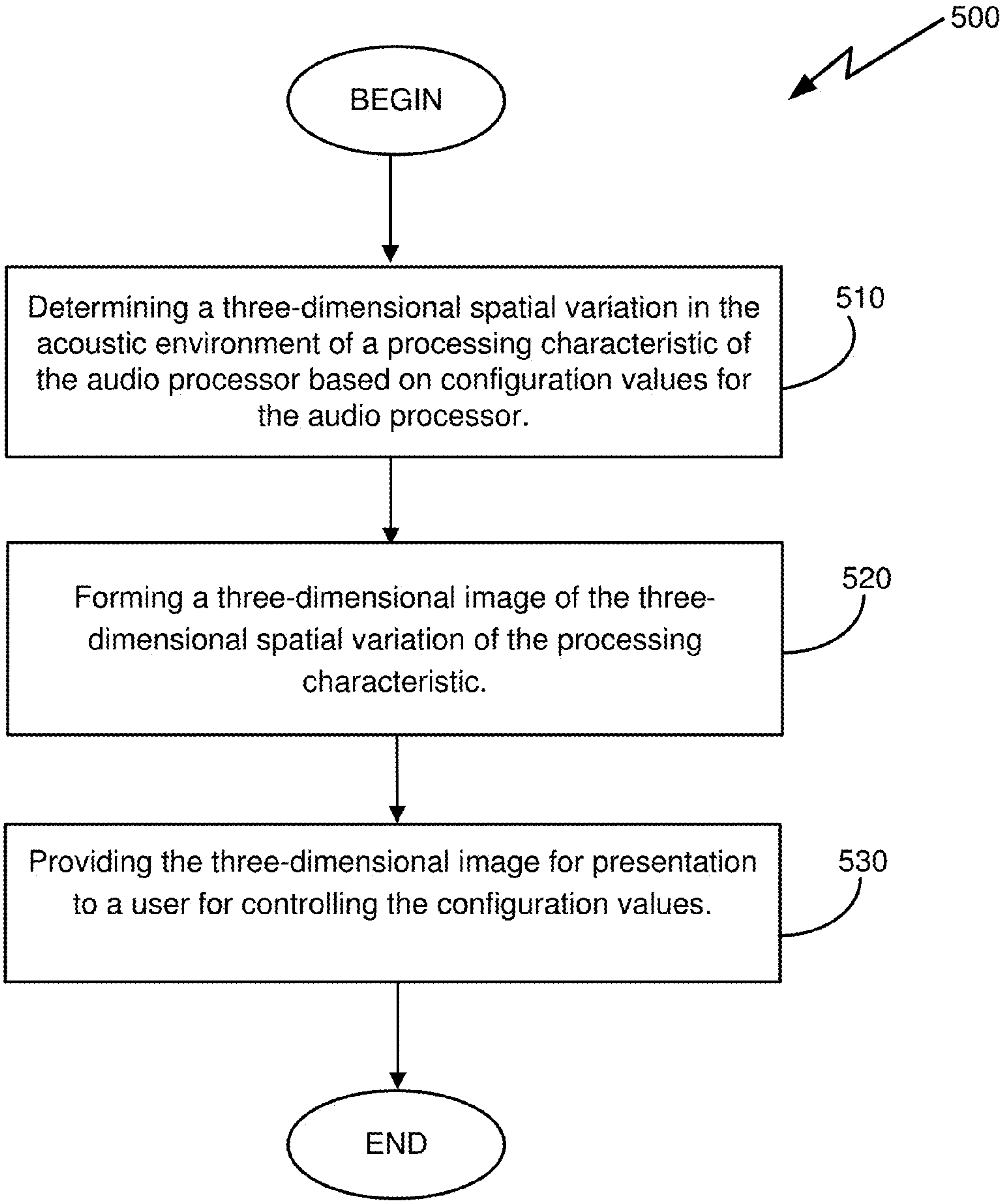
FIG. 5 is a flowchart of an example procedure for controlling a configurable audio processor.

With reference next to FIG. 5, a flowchart of an example procedure 500 for controlling a configurable audio processor (such as the processor 242 depicted in FIG. 2) coupled via a plurality of transducers (such as the microphones 220A-C and the loudspeakers 224A-B illustrated in FIG. 2) to an acoustic environment is provided. The procedure 500 includes determining 510 a three-dimensional spatial variation in the acoustic environment of a processing characteristic of the audio processor based on configuration values (such as those computed by the configuration value computation unit 240 of FIG. 2) for the audio processor. The procedure 500 further includes forming 520 a three-dimensional image of the three-dimensional spatial variation of the processing characteristic, and providing 530 the three-dimensional image for presentation to a user for controlling the configuration values.

In some examples, the plurality of transducers may include a microphone array. In such examples the three-dimensional spatial variation in the acoustic environment of the processing characteristic may include a spatial variation of an input sound sensitivity. The three-dimensional image may represent a direction of sensitivity of input sound sensitivity. The three-dimensional image may further represents a spatial extent of the input sound sensitivity. In various examples, the three-dimensional spatial variation in the acoustic environment of the processing characteristic may further include a spatial variation of a level of an audio input captured by the microphone array. In certain examples, the plurality of transducers may include a plurality of loudspeakers, and the three-dimensional spatial variation in the acoustic environment of the processing characteristic may include a spatial variation of an output gain.

The procedure 500 may further include rendering the three-dimensional image to the user. The rendering may be performed on a rendering device that includes one or more of, for example, an augmented reality device, a virtual reality device, and/or a two-dimensional touchscreen device.

The procedure may further include processing an input from the user received in response to a rendering of the three-dimensional image to determine updated configuration values for the audio processor. In such examples, the procedure further includes determining an updated three-dimensional image based on an updated three-dimensional spatial variation of the processing characteristic determined in response to the input from the user, and rendering the updated three-dimensional image to the user. The procedure may further include operating the audio processor according to the configuration values.

In some examples, controlling the configuration values of the processing characteristic of the audio processor may include capturing interactive user inputs, responsive to the three-dimensional image of the processing characteristic, to controllably vary the processing characteristic of the audio processor to achieve a target behavior of the audio processor according to the varied processing characteristic, determining adjusted configuration values of the processing characteristic to achieve the target behavior of the audio processor according to the varied processing characteristic, and configuring parameters of an audio system controlled by the audio processor according to the determined adjusted configuration values of the processing characteristic. Capturing the interactive user inputs may include capturing user hand gestures (e.g., through a camera or motion sensors) indicative of changes to the processing characteristic.

Implementation described herein, including implementations using neural networks, can be realized on any computing platform, including computing platforms that include one or more microprocessors, microcontrollers, and/or digital signal processors that provide processing functionality, as well as other computation and control functionality. The computing platform can include one or more CPU's, one or more graphics processing units (GPU's, such as NVIDIA GPU's), and may also include special purpose logic circuitry, e.g., an FPGA (field programmable gate array), an ASIC (application-specific integrated circuit), a DSP processor, an accelerated processing unit (APU), an application processor, customized dedicated circuity, etc., to implement, at least in part, the processes and functionality for the neural network, processes, and methods described herein. The computing platforms typically also include memory for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc. The various learning processes implemented through use of the neural networks may be configured or programmed using TensorFlow (a software library used for machine learning applications such as neural networks). Other programming platforms that can be employed include keras (an open-source neural network library) building blocks, NumPy (an open-source programming library useful for realizing modules to process arrays) building blocks, etc.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for using an augmented reality platform when controlling a sound-sensitivity pattern produced by an audio processor (242) processing signals of a microphone array that comprises microphones (220A-C, 224A-B) coupled to an acoustic environment (204) based on a configuration (241) of the audio processor that is controlled by a user, the method comprising:

operating the audio processor according to a first configuration, using the microphones in the array to form the sound-sensitivity pattern, wherein forming the sound-sensitivity pattern comprises:

determining a spatial variation in the acoustic environment for an input-sound sensitivity of the audio processor based on the first configuration of the audio processor, the spatial variation being a three-dimensional spatial variation that comprises a spatial variation of the input-sound sensitivity of the audio processor, rendering a first image, the first image being a three-dimensional image (237) of the spatial variation of the audio processor's input-sound sensitivity, presenting the rendered first image to the user, after having presented the rendered first image to the user, receiving, from the user, an input that comprises instructions for adjusting the input-sound sensitivity, in response to the input thus received, generating a second configuration and rendering a second image, the second image being an updated three-dimensional image that reflects a change to the input-sound sensitivity resulting from the second configuration, presenting the rendered second image to the user, and operating the audio processor based on the adjusted configuration.

2. A method for controlling a configurable audio processor (242) coupled via a plurality of transducers (220A-C, 224A-B) to an acoustic environment (204), the method comprising:

determining a three-dimensional spatial variation in the acoustic environment of a processing characteristic of the audio processor based on configuration values (241) for the audio processor (242);

forming a three-dimensional image (237) of the three-dimensional spatial variation of the processing characteristic; and providing the three-dimensional image (237) for presentation to a user (202) for controlling the configuration values.

3. The method of claim 2, further comprising rendering the three-dimensional image to the user.

4. The method of claim 2, further comprising processing an input from the user received in response to a rendering of the three-dimensional image to determine updated configuration values for the audio processor.

5. The method of claim 4, further comprising determining an updated three-dimensional image based on an updated three-dimensional spatial variation of the processing characteristic determined in response to the input from the user, and rendering the updated three-dimensional image to the user.

6. The method of any of claim 2, further comprising operating the audio processor according to the configuration values.

7. The method of claim 2, wherein the plurality of transducers comprises a microphone array.

8. The method of claim 7, wherein the three-dimensional spatial variation in the acoustic environment of the processing characteristic comprises a spatial variation of an input sound sensitivity.

9. The method of claim 8, wherein the three-dimensional image represents a direction of sensitivity of input sound sensitivity.

10. The method of claim 9, wherein the three-dimensional image further represents a spatial extent of the input sound sensitivity.

11. The method of claim 7, wherein the three-dimensional spatial variation in the acoustic environment of the processing characteristic further comprises a spatial variation of a level of an audio input captured by the microphone array.

12. The method of claim 2, wherein the plurality of transducers comprises a plurality of loudspeakers, and wherein the three-dimensional spatial variation in the acoustic environment of the processing characteristic comprises a spatial variation of an output gain.

13. The method of claim 2, wherein forming the three-dimensional image comprises forming the three-dimensional image on a visualization platform comprising a rendering device that includes one or more of: an augmented reality device, a virtual reality device, or a two-dimensional touchscreen device.

14. The method of claim 2, wherein controlling the configuration values of the processing characteristic of the audio processor comprises:

capturing interactive user inputs, responsive to the three-dimensional image of the processing characteristic, to controllably vary the processing characteristic of the audio processor to achieve a target behavior of the audio processor according to the varied processing characteristic;

determining adjusted configuration values of the processing characteristic to achieve the target behavior of the audio processor according to the varied processing characteristic; and configuring parameters of an audio system controlled by the audio processor according to the determined adjusted configuration values of the processing characteristic.

15. The method of claim 14, wherein capturing the interactive user inputs comprises:

capturing user hand gestures indicative of changes to the processing characteristic.

16. The method of claim 3, further comprising processing an input from the user received in response to a rendering of the three-dimensional image to determine updated configuration values for the audio processor.

17. The method of claim 16, further comprising determining an updated three-dimensional image based on an updated three-dimensional spatial variation of the processing characteristic determined in response to the input from the user, and rendering the updated three-dimensional image to the user.

18. The method of any of claim 17, further comprising operating the audio processor according to the configuration values.

19. The method of claim 18, wherein the plurality of transducers comprises a microphone array.

20. The method of claim 19, wherein the three-dimensional spatial variation in the acoustic environment of the processing characteristic comprises a spatial variation of an input sound sensitivity.

21. The method of claim 20, wherein the three-dimensional image represents a direction of sensitivity of input sound sensitivity.

22. The method of claim 21, wherein the three-dimensional image further represents a spatial extent of the input sound sensitivity.

23. An audio processing system comprising:

a visualization platform (236, 250);

a plurality of transducers (220A-C, 224A-B);

a configurable audio processor (242) to at least control the plurality of transducers; and a controller (234, 240) in electrical communication with the visualization platform, the plurality of transducers, and the audio processor, the controller configured to:

determine a three-dimensional spatial variation in an acoustic environment of a processing characteristic based on configuration values (241) for the audio processor (230);

form a three-dimensional image (237) of the three-dimensional spatial variation of the processing characteristic; and provide the three-dimensional image for presentation on the visualization platform to a user (202) to control the configuration values.

24. The audio processing system of claim 23, wherein the plurality of transducers comprises a microphone array, wherein the three-dimensional spatial variation in the acoustic environment of the processing characteristic comprises a spatial variation of an input sound sensitivity, and wherein the three-dimensional image represents one or more of: a direction of sensitivity of input sound sensitivity, or a spatial extent of the input sound sensitivity.

25. The audio processing system of claim 23, wherein the plurality of transducers comprises a plurality of loudspeakers, and wherein the three-dimensional spatial variation in the acoustic environment of the processing characteristic comprises a spatial variation of an output gain.

26. The audio processing system of claim 23, wherein the controller is further configured to process an input from the user received in response to a rendering of the three-dimensional image to determine updated configuration values for the audio processor.

27. The audio processing system of claim 26, wherein the controller is further configured to determine an updated three-dimensional image based on an updated three-dimensional spatial variation of the processing characteristic determined in response to the input from the user and cause a rendering of the updated three-dimensional image.

28. A non-transitory computer readable media for controlling a configurable audio processor (243) coupled via a plurality of transducers (220A-C, 224A-B) to an acoustic environment (204), the computer readable media storing a set of instructions, executable on at least one programmable device, to:

determine a three-dimensional spatial variation in the acoustic environment of a processing characteristic of the audio processor based on configuration values (241) for the audio processor;

form a three-dimensional image (237) of the three-dimensional spatial variation of the processing characteristic; and provide the three-dimensional image for presentation to a user (202) for controlling the configuration values.

29. A computing apparatus comprising:

one or more programmable devices to control a configurable audio processor (242), coupled via a plurality of transducers (220A-C, 224A-B) to an acoustic environment (204) by determining a three-dimensional spatial variation in the acoustic environment of a processing characteristic of the audio processor based on configuration values (241) for the audio processor (242);

forming a three-dimensional image (237) of the three-dimensional spatial variation of the processing characteristic; and providing the three-dimensional image (237) for presentation to a user (202) for controlling the configuration values.

30. The method of claim 3, further comprising processing an input from the user received in response to rendering of the three-dimensional image to determine updated configuration values for the audio processor.

31. The method of claim 30, further comprising determining an updated three-dimensional image based on an updated three-dimensional spatial variation of the processing characteristic determined in response to the input from the user, and rendering the updated three-dimensional image to the user.

* * * * *